US005670577A

United States Patent [19]
Dawson, Jr.

[11] Patent Number: 5,670,577
[45] Date of Patent: Sep. 23, 1997

[54] WATERPROOF HOT MELT COMPOSITION FOR STITCHED SEAMS

[75] Inventor: Glen E. Dawson, Jr., Arden Hills, Minn.

[73] Assignee: H. B. Fuller Licensing & Financing, Inc., St. Paul, Minn.

[21] Appl. No.: 768,965

[22] Filed: Nov. 27, 1996

Related U.S. Application Data

[63] Continuation of Ser. No. 534,056, Sep. 29, 1995, abandoned.

[51] Int. Cl.$^6$ .................. C08L 93/00; B32B 7/12
[52] U.S. Cl. .......... 525/95; 524/271; 428/355 BL; 156/93
[58] Field of Search ............. 525/95; 524/271, 524/272, 274; 428/355 BL; 156/93

[56] References Cited

U.S. PATENT DOCUMENTS

| | | | |
|---|---|---|---|
| 3,787,531 | 1/1974 | Dahlquist et al. | 525/95 X |
| 4,032,492 | 6/1977 | Englund et al. | 215/233 X |
| 4,141,876 | 2/1979 | Hansen | 525/95 X |
| 4,242,402 | 12/1980 | Korpman | 525/95 X |
| 4,411,954 | 10/1983 | Butch, III et al. | 428/343 |
| 4,419,494 | 12/1983 | Puletti et al. | 524/272 X |
| 4,604,152 | 8/1986 | Liukko | 156/93 |
| 4,605,578 | 8/1986 | Emrich et al. | 428/57 |
| 4,857,594 | 8/1989 | Lakshmanan et al. | 524/477 X |
| 5,169,890 | 12/1992 | Eadara et al. | 524/271 |
| 5,356,963 | 10/1994 | Kauffman et al. | 524/43 |

FOREIGN PATENT DOCUMENTS

| | | |
|---|---|---|
| 979829 | 1/1965 | United Kingdom . |
| 2 132 938 | 7/1984 | United Kingdom . |
| 2 215 660 | 9/1989 | United Kingdom . |

*Primary Examiner*—Daniel Zirker
*Attorney, Agent, or Firm*—Carolyn A. Fischer; Nancy N. Quan

[57] ABSTRACT

This invention relates to hot melt adhesive compositions useful for waterproofing stitched seams and a method of using the same. This invention particularly relates to certain hot melt adhesives which can be directly applied to a stitched seam such that the resulting seam is resistant to water penetration.

20 Claims, No Drawings

WATERPROOF HOT MELT COMPOSITION FOR STITCHED SEAMS

This application is a continuation of application Ser. No. 08/534,056 filed Sep. 29, 1995, now abandoned.

BACKGROUND OF THE INVENTION

This invention relates to hot melt adhesive compositions useful for waterproofing stitched seams and a method of using the same. This invention particularly relates to certain hot melt adhesives which can be directly applied to a stitched seam such that the resulting seam is resistant to water penetration.

In the manufacture of waterproof articles such as rainwear, workwear, tents and shoes; several methods are known in the art for waterproofing stitched seams.

GB 2 215 660 A teaches covering a stitched seam with a tape of thermoplastic material fused by hot air or pressure. A tape is made by solvent casting a 20 to 40 percent by weight polyurethane solution onto a release sheet. The coated sheet is then slit and wound onto a reel. The tape can be applied to the garment using machinery known for applying tapes having heat-activated adhesives.

Liukko U.S. Pat. No. 4,604,152 and Emrich et al., U.S. Pat. No. 4,605,578 also pertain to methods of making a waterproof stitched seam using a heat-activated thermoadhesive material.

In general, and particularly in the shoe industry, the use of solvent cements or waterbased emulsions to seal the stitched seams in shoes and boots are widely used. This is very time consuming and labor intensive as multiple coating and drying steps are employed. Seams sealed in this manner are not generally durable and a high percentage of shoes and boots manufactured are sometimes returned due to water leakage complaints.

It is therefore desirable to employ a hot melt type adhesive, that can be readily applied to form a good reliable water-proofed seam. It is especially desirable to use a hot melt adhesive that is not heat-activated.

SUMMARY OF THE INVENTION

This invention relates to novel hot melt adhesive compositions and methods of using the same to manufacture waterproof stitched seams in the manufacturing of waterproof articles. The adhesives of the present invention can be applied directly to a stitched seam with any suitable known hot melt application equipment without first premanufacturing a tape. Preferably, the hot melt adhesive of the present invention is applied as a continuous bead to a stitched seam. Such application may be done by hand, with the aid of robotics, or with any other known automated hot melt application equipment. Upon cooling, the adhesive forms a non-tacky flexible seal over the stitched seam that exhibits excellent resistance to water penetration and remains flexible over a wide temperature range. The use of a hot melt has the distinct advantage of eliminating the need for solvents, which are necessarily undesirable because of environmental concerns and health risks to workers. Furthermore, directly coating a hot melt adhesive onto a stitched seam is more economical, less time consuming, and can actually result in superior seam performance relative to prior application methods that employed solvent types of adhesives.

The hot melt adhesive composition useful in the present invention comprises:

a) from about 5 to about 40% percent by weight of a substantially linear A-B-A block copolymer, wherein A is polystyrene and B is a substantially saturated rubbery midblock comprising ethylene/butylene, ethylene/propylene and mixtures thereof;

b) an amount up to about 15% by weight of a substantially A-B diblock copolymer wherein A is polystyrene and B is a rubbery block comprising isoprene, ethylene/butylene, ethylene/propylene, butadiene and mixtures thereof;

c) an amount up to about 20% by weight of a tackifying resin;

d) an amount up to about 20% by weight of a waxy material; and e) from about 10 to about 95% by weight of a plasticizer.

The adhesive compositions of the present invention may also be useful as a waterproof coating which could be coated onto any fabric or nonwoven surface that is intended to be resistant to water penetration.

DETAILED DESCRIPTION OF THE INVENTION

The hot melt adhesive composition of the present invention comprises a substantially linear A-B-A block copolymer wherein A is polystyrene and B is a substantially saturated rubbery midblock comprising ethylene/propylene, ethylene/butylene and mixtures thereof. This copolymer can be present in an amount from about 5 to about 40% by weight, preferably in an amount from about 20 to about 30% by weight. Examples of such polymers include those commercially available under the Kraton G® tradename from Shell Chemical Company. Branched or grafted versions of the Kraton G® polymers such as TKG-101 and RP-6912 are also suitable for use, either alone or in combination with other ungrafted Kraton G® polymers. The high cohesive strength and high plasticizer loading capacity of this copolymer is critical to the success of the present invention. It enables the resulting adhesive composition to exhibit a sufficiently low viscosity and low surface tension in the molten state so that it readily flows along the stitch line and wicks into the seam and stitch holes when applied. Upon cooling, the adhesive also maintains its flexibility over a wide temperature range. This is especially important because the seam thus formed would be required to endure extensive flexing. The copolymer also exhibits oxidative stability and good UV resistance, thus insuring good durability and longevity of the resulting waterproof seam.

Preferably, the adhesive composition comprises a second polymer, present in an amount up to about 15% by weight, more preferably in an amount of about 5 to about 10% by weight of a substantially A-B diblock copolymer. This polymer can be a solid or liquid at ambient temperature. Representative examples include those that are available from Shell Chemical Company under the tradename Kraton® G-1726 or LVSI-101.

The adhesive composition of the present invention preferably comprises a tackifying resin. This can be present in amounts up to about 20% by weight. Ideally, the tackifier is aromatic in nature, so it will preferably associate with the polystyrene end blocks. Examples of such resins are available from Hercules Inc. under the tradename Kristalex® and typically have softening points between 70° C. and 160° C. Midblock tackifiers may also be useful in the adhesives of the present invention so long as the resulting adhesive is not sufficiently tacky upon cooling. Midblock tackifiers are known in the art, and representative examples include polyterpene resins, coumarone-indene resins, hydrogenated rosins and rosin ester, as well as aliphatic and aromatic petroleum hydrocarbon resins.

A waxy material can also be present in the adhesive composition of the present invention. Preferably, the waxy material is present in amounts up to about 20% by weight, more preferably, in amounts ranging from about 1 to about 10% by weight. The waxy material is added to modify the viscosity, reduce the tack, and enhance the water barrier properties. The preferred waxy material includes any petroleum derived paraffin wax. Other useful waxes include microcrystalline waxes, Fischer-Tropsch, polyethylene and by-products of polyethylene.

Plasticizing agents, especially oils are also useful in the adhesive compositions of the present invention. Preferably, the plasticizing agent is a liquid at ambient temperature, and these include naphthenic or paraffinic hydrocarbon oils. Other useful plasticizers include polybutene, liquid tackifying resins, and liquid elastomers so long as the resulting adhesive is sufficiently tack free upon cooling. Others plasticizers include olefinic oligomers, low molecular weight polymers, vegetable oils and their derivatives thereof.

Various other components can also be added to modify the tack, color, odor, etc., of the hot melt adhesive compositions of the instant invention. These can include antioxidants and other stabilizing ingredients which are added to protect the adhesives from various heat and light induced degradation.

EXAMPLES

Examples 1–3 were made in the following manner in accordance with known hot melt manufacturing methods. The A-B-A block copolymer, antioxidant, resin, and about one half the oil was added to a sigma blade mixer with a hot oil temperature of about 350° F. (~ 177° C.). The ingredients are shown in Table 1. These were sheared for about 45 minutes until smooth. The diblock A-B block copolymer, wax and the remainder of the oil were then added sequentially.

APPLICATION METHODS

A bead of hot melt adhesive was applied by hand at a temperature of about 350° F. (~ 177° C.) with Slautterback Mini Squirt II hot melt application equipment. An appropriate nozzle size and application rate was selected depending on the seam width, seam thickness, and thread size. Typically, 0.3" (~ 7.6 mm) and 0.7" (~ 18 mm) slot die spreader nozzles as well as the standard 0.7" diameter nozzle were used to produce an adhesive bead that could sufficiently cover the seam and wick into the thread and stitch holes. The mass of adhesive applied ranged from about 0.5 grams/linear inch to 3 grams/linear inch depending on the nozzle size and application rate. The sealed stitched seam was then conditioned for at least 24 hours at ambient temperature prior to flex testing.

TEST METHODS

A waterproof stitched seam was formed as described above and then tested using a Dynamic Water Penetration Tester available from Koehler Instrument Company, Inc. in accordance with ASTM D2099, *Dynamic Water Resistance of Shoe Upper Leather by the Maeser Water Penetration Tester*. During testing, the waterproofed stitched seam was mounted in a flex tester, immersed in a salt water bath, and mechanically flexed. Water leakage was detected by electrical conductance. The test results are also depicted in Table 1. All three samples exceeded the minimum requirement of 20,000 flexes.

TABLE 1

| Ingredient | Tradename | Example 1 | Example 2 | Example 3 |
|---|---|---|---|---|
| A-B-A Block Copolymer | Kraton G 1652 | 26.0% | 25.0% | 28.0% |
| A-B Block Copolymer | Kraton G 1726 | — | 6.5 | — |
| A-B Block Copolymer | LSVI-101 | 7.0 | — | — |
| Tackifier | Kristalex 3100 | 8.0 | — | — |
| Tackifier | Kristalex 3085 | — | 7.0 | — |
| Wax | Paraffin 155 | 4.0 | 3.0 | 5.0 |
| Plasticizer | Kaydol Oil | 54.8 | — | 57.8 |
| Plasticizer | 500 Oil | — | 58.0 | — |
| Plasticizer | Parapol 1300 | — | — | 9.0 |
| Antioxidant | Irganox 1010 | 0.1 | 0.3 | 0.1 |
| Antioxidant | Irganox 1076 | 0.1 | 0.2 | 0.1 |
| Viscosity @ 250° F. | | not measured | 18,650 cps | 41,900 cps |
| Viscosity @ 275° F. | | 7,013 cps | 7,288 cps | 9,700 |
| Viscosity @ 300° F. | | 3,130 cps | 3,635 cps | 3,300 |
| Viscosity @ 350° F. | | 1,668 cps | 2,085 cps | not measured |
| ASTM-D2099 | | Exceeded 40,000 flexes | Exceeded 22,000 flexes | Exceeded 20,000 |

I claim:

1. A hot melt adhesive composition comprising:
   (a) from about 5 to about 40 percent by weight of an A-B-A block copolymer wherein A is polystyrene and B is a substantially saturated rubbery midblock;
   (b) an amount up to about 15 percent by weight of a substantially A-B diblock copolymer wherein A is polystyrene and B is a rubbery block and said diblock copolymer is a liquid at ambient temperature;
   (c) an amount up to about 20 percent by weight of a waxy material;
   (d) an amount up to about 20 percent by weight of a tackifying resin; and
   (e) from about 10 to about 90 percent by weight of a plasticizer;
   wherein said adhesive composition forms a waterproof coating.

2. The hot melt adhesive of claim 1 wherein said B block of said A-B-A block copolymer is selected from the group consisting of ethylene/butylene, ethylene/propylene and mixtures thereof.

3. The adhesive of claim 2 wherein said B block of said A-B-A block copolymer is ethylene/butylene.

4. The hot melt adhesive of claim 1 wherein said B block of said A-B diblock copolymer is selected from the group consisting of isoprene, ethylene/butylene, ethylene/propylene, butadiene and mixtures thereof.

5. The adhesive of claim 4 wherein said B block of said A-B diblock copolymer is isoprene.

6. The adhesive of claim 1 wherein said tackifying resin is sufficiently aromatic such that said tackifying resin associates primarily with the polystyrene endblock.

7. The adhesive of claim 1 wherein said plasticizer is selected from the group consisting of napthenic oil, paraffinic oil, polybutene and mixtures thereof.

8. A waterproof stitched seam comprising a stitched seam having a plurality of water permeable stitch holes and a hot melt adhesive composition applied molten directly to said seam, said hot melt adhesive comprising:
   (a) from about 5 to about 40 percent by weight of an A-B-A block copolymer wherein A is polystyrene and B is a substantially saturated rubbery midblock;
   (b) an amount up to about 15 percent by weight of a substantially A-B diblock copolymer wherein A is polystyrene and B is a rubbery block;
   (c) an amount up to about 20 percent by weight of a waxy material;
   (d) an amount up to about 20 percent by weight of a tackifying resin; and
   (e) from about 10 to about 90 percent by weight of a plasticizer;
wherein said seam exceeds 20,000 flexes before leakage.

9. The hot melt adhesive of claim 8 wherein said B block of said A-B-A block copolymer is selected from the group consisting of ethylene/butylene, ethylene/propylene and mixtures thereof.

10. The adhesive of claim 9 wherein said B block of said A-B-A block copolymer is ethylene/butylene.

11. The hot melt adhesive of claim 8 wherein said B block of said A-B diblock copolymer is selected from the group consisting of isoprene, ethylene/butylene, ethylene/propylene, butadiene and mixtures thereof.

12. The adhesive of claim 11 wherein said B block of said A-B diblock copolymer is isoprene.

13. The adhesive of claim 8 wherein said tackifying resin is sufficiently aromatic such that said tackifying resin associates primarily with the polystyrene endblock.

14. The adhesive of claim 8 wherein said plasticizer is selected from the group consisting of napthenic oil, paraffinic oil, polybutene and mixtures thereof.

15. An article of manufacture selected from the group consisting of rainwear, workwear, shoes, boots, and tents further comprising the waterproof stitched seam of claim 8.

16. The waterproofed stitched seam of claim 15 wherein the article is a shoe or boot.

17. A method of waterproofing a stitched seam wherein the hot melt adhesive composition of claim 8 is applied molten directly to a stitched seam such that the resulting seam is resistant to water penetration.

18. The method of claim 17 wherein said hot melt adhesive is applied as a continuous bead.

19. The method of claim 17 wherein said hot melt adhesive is sprayed or extruded onto said stitched seam.

20. An article resistant to water penetration comprising a water permeable layer and the hot melt adhesive of claim 1 disposed on said water permeable layer.

* * * * *